(12) United States Patent
Laws et al.

(10) Patent No.: US 9,918,459 B2
(45) Date of Patent: Mar. 20, 2018

(54) FISHING POLE HEATING ASSEMBLY

(71) Applicants: Chris Laws, Lenoir, NC (US); Satin Laws, Lenoir, NC (US)

(72) Inventors: Chris Laws, Lenoir, NC (US); Satin Laws, Lenoir, NC (US)

( * ) Notice: Subject to any disclaimer, the term of this patent is extended or adjusted under 35 U.S.C. 154(b) by 119 days.

(21) Appl. No.: 14/947,051

(22) Filed: Nov. 20, 2015

(65) Prior Publication Data

US 2017/0142950 A1    May 25, 2017

(51) Int. Cl.
*A01K 97/01* (2006.01)
*A01K 87/00* (2006.01)

(52) U.S. Cl.
CPC ............ *A01K 97/01* (2013.01); *A01K 87/007* (2013.01)

(58) Field of Classification Search
CPC ........ A01K 97/00; A01K 97/01; A01K 97/06; A01K 87/00; A01K 87/007; A01K 87/02; A01K 87/04
See application file for complete search history.

(56) References Cited

U.S. PATENT DOCUMENTS

| | | | |
|---|---|---|---|
| 2,758,592 A * | 8/1956 | Phipps | A01K 87/08 126/208 |
| 3,164,921 A | 1/1965 | Mavrakis | |
| 4,195,433 A * | 4/1980 | Engman | A01K 97/125 43/17 |
| 4,598,192 A | 7/1986 | Garrett | |
| 4,646,461 A | 3/1987 | McLeod | |
| 4,990,753 A * | 2/1991 | Hollander | B62D 1/065 219/204 |
| 5,175,953 A | 1/1993 | Lesnock | |
| D354,112 S | 1/1995 | Paggi | |
| 5,517,786 A | 5/1996 | Peissig | |
| D380,806 S | 7/1997 | Ostrander | |
| 5,655,328 A * | 8/1997 | Childs | A01K 87/085 219/535 |
| 5,845,428 A * | 12/1998 | Miller | A01K 87/085 43/18.1 R |
| 6,460,285 B2 * | 10/2002 | Collins | A01K 87/08 43/18.1 CT |
| 2002/0157660 A1 * | 10/2002 | Trzeciak | A01K 87/085 126/226 |
| 2005/0103769 A1 * | 5/2005 | Marquis | A01K 87/085 219/204 |
| 2010/0281753 A1 * | 11/2010 | Gonzagowski | A01K 87/007 43/17.5 |

* cited by examiner

*Primary Examiner* — Thanh Pham

(57) ABSTRACT

A fishing pole heating assembly includes a fishing pole that has a handle portion and a rod portion. The fishing pole includes a reel coupled to the handle portion and a plurality of eyelets coupled to the rod portion. The eyelets are spaced apart from each other and extend along the rod portion. A heating apparatus is coupled to the fishing rod and the heating apparatus heats the eyelets.

6 Claims, 2 Drawing Sheets

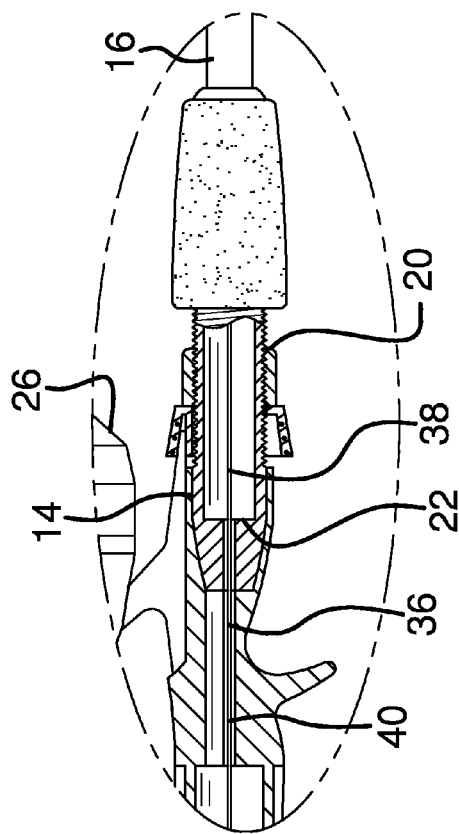
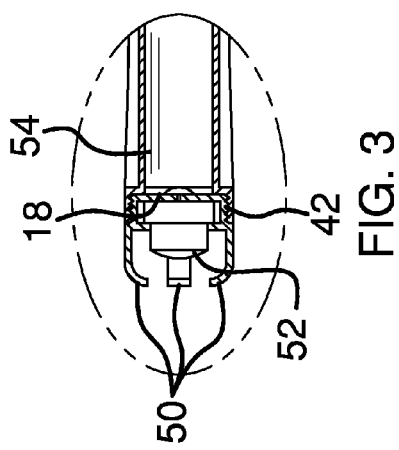
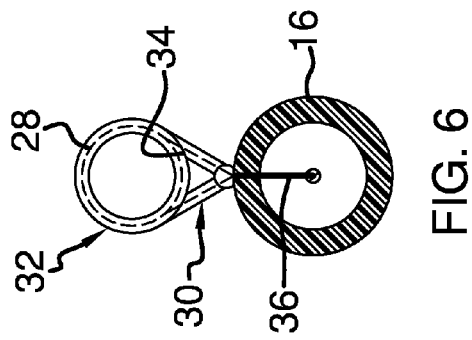
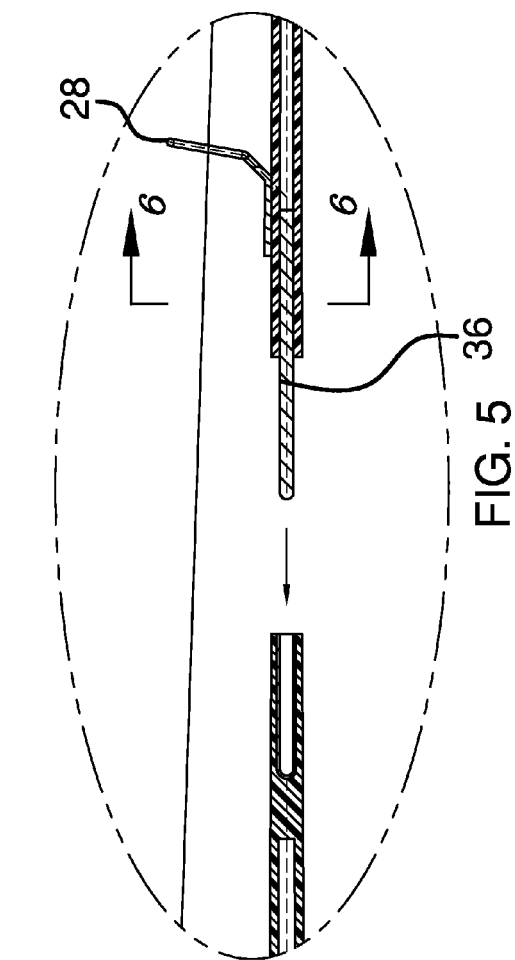

FISHING POLE HEATING ASSEMBLY

BACKGROUND OF THE DISCLOSURE

Field of the Disclosure

The disclosure relates to heating devices and more particularly pertains to a new heating device for heating a handle, reel and eyelets of a fishing pole.

SUMMARY OF THE DISCLOSURE

An embodiment of the disclosure meets the needs presented above by generally comprising a fishing pole that has a handle portion and a rod portion. The fishing pole includes a reel coupled to the handle portion and a plurality of eyelets coupled to the rod portion. The eyelets are spaced apart from each other and extend along the rod portion. A heating apparatus is coupled to the fishing rod and the heating apparatus heats the eyelets to prevent formation of ice thereon.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a cross sectional view taken along line 3-3 of FIG. 1 of an embodiment of the disclosure.

FIG. 4 is a cross sectional view taken along line 4-4 of FIG. 1 of an embodiment of the disclosure.

FIG. 5 is a cross sectional view taken along line 5-5 of FIG. 1 of an embodiment of the disclosure.

FIG. 6 is a cross sectional view taken along line 6-6 of FIG. 5 of an embodiment of the disclosure.

DESCRIPTION OF THE PREFERRED EMBODIMENT

Figure 1:
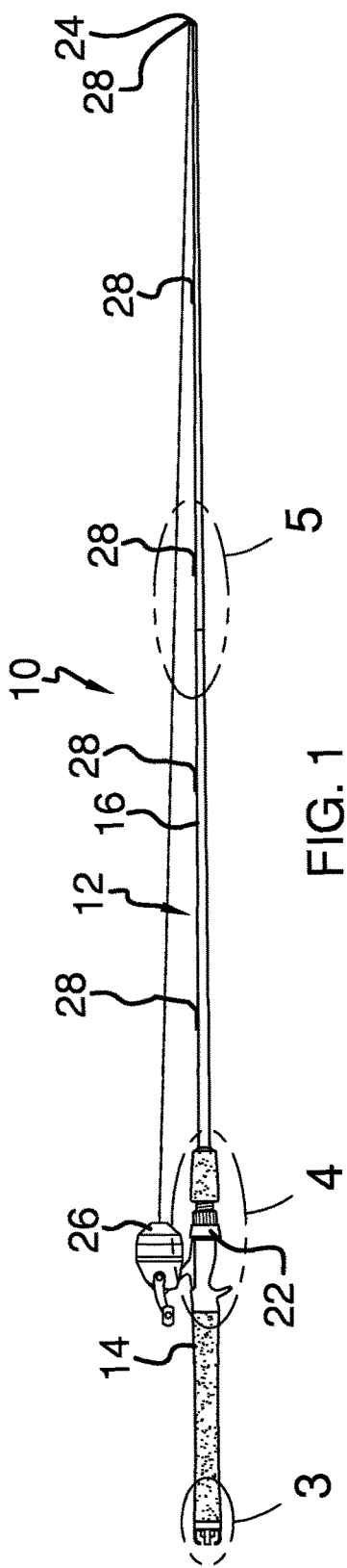
FIG. 1 is a perspective view of a fishing pole heating assembly according to an embodiment of the disclosure.
Figure 2:
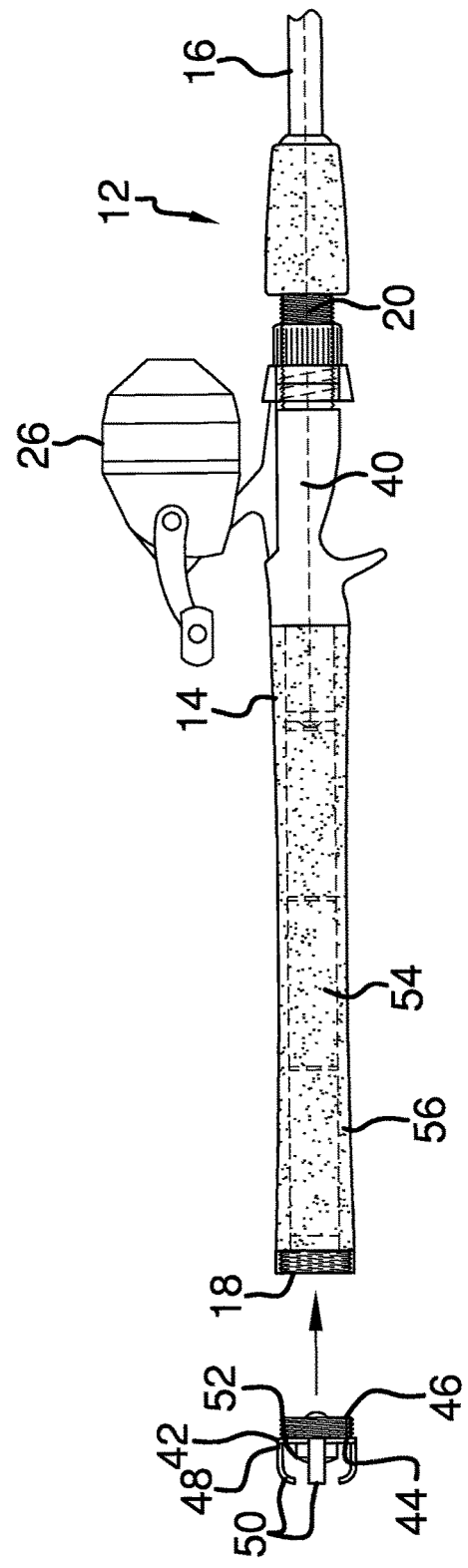
FIG. 2 is a right side view of an embodiment of the disclosure.

With reference now to the drawings, and in particular to FIGS. 1 through 6 thereof, a new heating device embodying the principles and concepts of an embodiment of the disclosure and generally designated by the reference numeral 10 will be described.

As best illustrated in FIGS. 1 through 6, the fishing pole heating assembly 10 generally comprises a fishing pole 12 that includes a handle portion 14 and a rod portion 16. The handle portion 14 has a first end 18 and a second end 20. The first end 18 may be open and the handle portion 14 may be substantially hollow. The rod portion 16 has a primary end 22 and a secondary end 24 and the primary end 22 is removably coupled to the second end 20.

The fishing pole 12 further includes a reel 26 coupled to the handle portion 14 and a plurality of eyelets 28 coupled to the rod portion 16. The eyelets 28 are spaced apart from each other and extend between the primary end 22 and the secondary end 24. The fishing pole 12 may be of any conventional design and the reel 26 may be a fishing reel of any conventional design. The eyelets 28 may include a stem portion 30 and a ring portion 32. The stem portion 30 is coupled to and extends upwardly from the rod portion 16. The ring portion 32 is coupled to a distal end 34 of the stem portion 30 with respect to the rod portion 16.

A heating apparatus 36 is coupled to the fishing rod 12 to heat the eyelets 28. The heating apparatus 36 comprises a rod heating element 38 positioned within the rod portion 16. The rod heating element 38 extends between the primary end 22 and the secondary end 24 and the rod heating element 38 is in thermal communication with the reel 26 and each of the eyelets 28. The rod heating element 38 heats the reel 26 and each of the eyelets 28 when the rod heating element 38 is actuated.

A handle heating element 40 is positioned within the handle portion 14. The handle heating element 40 is in thermal communication with the handle portion 14 and the handle heating element 40 heats the handle portion 14 when the handle heating element 40 is actuated. The rod heating element 38 is electrically coupled to the handle heating element 40 when the primary end 22 is removably coupled to the second end 20. The rod heating element 38 and the handle heating element 40 may be electric heating elements of any conventional design having an operational temperature ranging between 60° Fahrenheit and 80° Fahrenheit.

A cap 42 is removably coupled to the first end 18 of the handle portion 14. The cap 42 has a front side 44, a back side 46 and an outer edge 48 extending therebetween. The cap 42 includes a plurality of fingers 50 coupled to and extending rearwardly away from the back side 46. The fingers 50 are positioned adjacent to the outer edge 48 and the fingers 50 are distributed around the outer edge 48 such that the fingers 50 surround the back side 46.

An actuator 52 is coupled to the back side 46 and the actuator 52 is electrically coupled to the rod heating element 38 and the handle heating element 40. The actuator 52 is actuatable in a first position such the handle heating element 40 is actuated. The actuator 52 is actuatable in a second position such that the rod heating element 38 and the handle heating element 40 are actuated. The actuator 52 is actuatable in a third position such that the rod heating element 38 and the handle heating element 40 are de-actuated. The fingers 50 prevent the actuator 52 from being bumped or otherwise inadvertently actuated. A power supply 54 is positioned within the handle portion 14 and the power supply 54 is electrically coupled to the actuator 52. The power supply 54 comprises at least one battery 56.

In use, the fishing rod 12 is used in the convention of ice fishing. The actuator 52 is actuated in the first position to bring the handle portion 14 to a comfortable temperature while the handle portion 14 is being gripped. The actuator 52 is actuated in the second position to additionally heat the reel 26 and the eyelets 28 to prevent ice from forming on the reel 26 and the eyelets 28. The at least one battery 56 is replaced when the at least one battery 56 becomes depleted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A fishing pole heating assembly configured to prevent ice formation on the fishing pole, said assembly comprising:
   a fishing pole having a handle portion and a rod portion, said handle portion having a first end and a second end, said rod portion having a primary end and a secondary end, said primary end being removably coupled to said second end, said fishing pole including;
   a reel coupled to said handle portion;
   a plurality of eyelets coupled to said rod portion, said eyelets being spaced apart from each other and extending along said rod portion; and
   a heating apparatus coupled to said fishing rod, said heating apparatus heating said eyelets, said heating apparatus comprising a rod heating element positioned within said rod portion, said rod heating element extending between said primary end and said secondary end, said rod heating element being in thermal communication with said reel and each of said eyelets, said rod heating element heating said reel and each of said eyelets when said rod heating element is actuated.

2. The assembly according to claim 1, further comprising a handle heating element positioned within said handle portion, said handle heating element being in thermal communication with said handle portion, said handle heating element heating said handle portion when said handle heating element is actuated, said rod heating element being electrically coupled to said handle heating element when said primary end is removably coupled to said second end.

3. The assembly according to claim 1, further comprising a cap removably coupled to said first end of said handle portion, said cap having a front side, a back side and an outer edge extending therebetween, said cap including a plurality of fingers coupled to and extending rearwardly away from said back side, said fingers being positioned adjacent to said outer edge, said fingers being distributed around said outer edge such that said fingers surround said back side.

4. The assembly according to claim 3, further comprising:
   said heating apparatus comprising a handle heating element and a rod heating element; and
   an actuator coupled to said back side, said actuator being electrically coupled to said rod heating element and said handle heating element, said actuator being actuatable in a first position such said handle heating element is actuated, said actuator being actuatable in a second position such that said rod heating element and said handle heating element are actuated, said actuator being actuatable in a third position such that said rod heating element and said handle heating element are de-actuated.

5. The assembly according to claim 4, further comprising a power supply positioned within said handle portion, said power supply being electrically coupled to said actuator, said power supply comprising at least one battery.

6. A fishing pole heating assembly configured to prevent ice formation on the fishing pole, said assembly comprising:
   a fishing pole including a handle portion and a rod portion, said handle portion having a first end and a second end, said rod portion having a primary end and a secondary end, said primary end being removably coupled to said second end, said fishing pole including:
   a reel coupled to said handle portion;
   a plurality of eyelets coupled to said rod portion, said eyelets being spaced apart from each other and extending between said primary end and said secondary end;
   a heating apparatus coupled to said fishing rod, said heating apparatus heating said eyelets, said heating apparatus comprising:
     a rod heating element positioned within said rod portion, said rod heating element extending between said primary end and said secondary end, said rod heating element being in thermal communication with said reel and each of said eyelets, said rod heating element heating said reel and each of said eyelets when said rod heating element is actuated;
     a handle heating element positioned within said handle portion, said handle heating element being in thermal communication with said handle portion, said handle heating element heating said handle portion when said handle heating element is actuated, said rod heating element being electrically coupled to said handle heating element when said primary end is removably coupled to said second end;
     a cap removably coupled to said first end of said handle portion, said cap having a front side, a back side and an outer edge extending therebetween, said cap including a plurality of fingers coupled to and extending rearwardly away from said back side, said fingers being positioned adjacent to said outer edge, said fingers being distributed around said outer edge such that said fingers surround said back side;
     an actuator coupled to said back side, said actuator being electrically coupled to said rod heating element and said handle heating element, said actuator being actuatable in a first position such said handle heating element is actuated, said actuator being actuatable in a second position such that said rod heating element and said handle heating element are actuated, said actuator being actuatable in a third position such that said rod heating element and said handle heating element are de-actuated; and
   a power supply positioned within said handle portion, said power supply being electrically coupled to said actuator, said power supply comprising at least one battery.

* * * * *